(12) United States Patent
Frech et al.

(10) Patent No.: US 6,467,176 B1
(45) Date of Patent: Oct. 22, 2002

(54) HAND-OPERATED SCROLL SAWING MACHINE WITH A SUPPORT SURFACE THAT CAN BE DETACHABLY CLIPPED TO A SAWING TABLE

(75) Inventors: Alfred Frech, Leinfelden-Echterdingen (DE); Tobias Lutz, Filderstadt (DE); Uwe Engelfried, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,693
(22) PCT Filed: Apr. 22, 2000
(86) PCT No.: PCT/DE00/01289
§ 371 (c)(1), (2), (4) Date: Jan. 11, 2001
(87) PCT Pub. No.: WO00/74906
PCT Pub. Date: Dec. 14, 2000

(30) Foreign Application Priority Data

Jun. 5, 1999 (DE) .......................................... 199 25 749

(51) Int. Cl.[7] .......................... B23D 51/02; B27B 19/12
(52) U.S. Cl. .......................... 30/392; 30/122; 30/296.1; 83/574; 83/746
(58) Field of Search .......................... 30/392, 393, 122, 30/296.1; 83/574, 746

(56) References Cited

U.S. PATENT DOCUMENTS

| 2,015,275 | A | * | 9/1935 | Kelley |  |
| 2,753,898 | A | * | 7/1956 | MacFarland |  |
| 3,117,600 | A | * | 1/1964 | Davis | .......................... 83/574 |

* cited by examiner

*Primary Examiner*—Hyei-Siu Payer
(74) *Attorney, Agent, or Firm*—Michael J. Striker

(57) ABSTRACT

A handheld power fret saw (10) having a power fret saw blade (33), which can be clamped releasably between two arms (122, 222), on their ends, that are preferably formed of a U-shaped bracket (22) comprising tubing, the end of one of the arms (221, 222) carrying a handgrip (13), is used especially universally with high precision because the power fret saw (10) can be clipped releasably, in particular in the manner of a bayonet mount, to a sawing table (37), and together with the sawing table (37) the power fret saw (10) forms a portable handheld power tool, which when the sawing table (37) is secured to a workbench or the like serves as a stationary tool.

12 Claims, 15 Drawing Sheets

Figure 1:
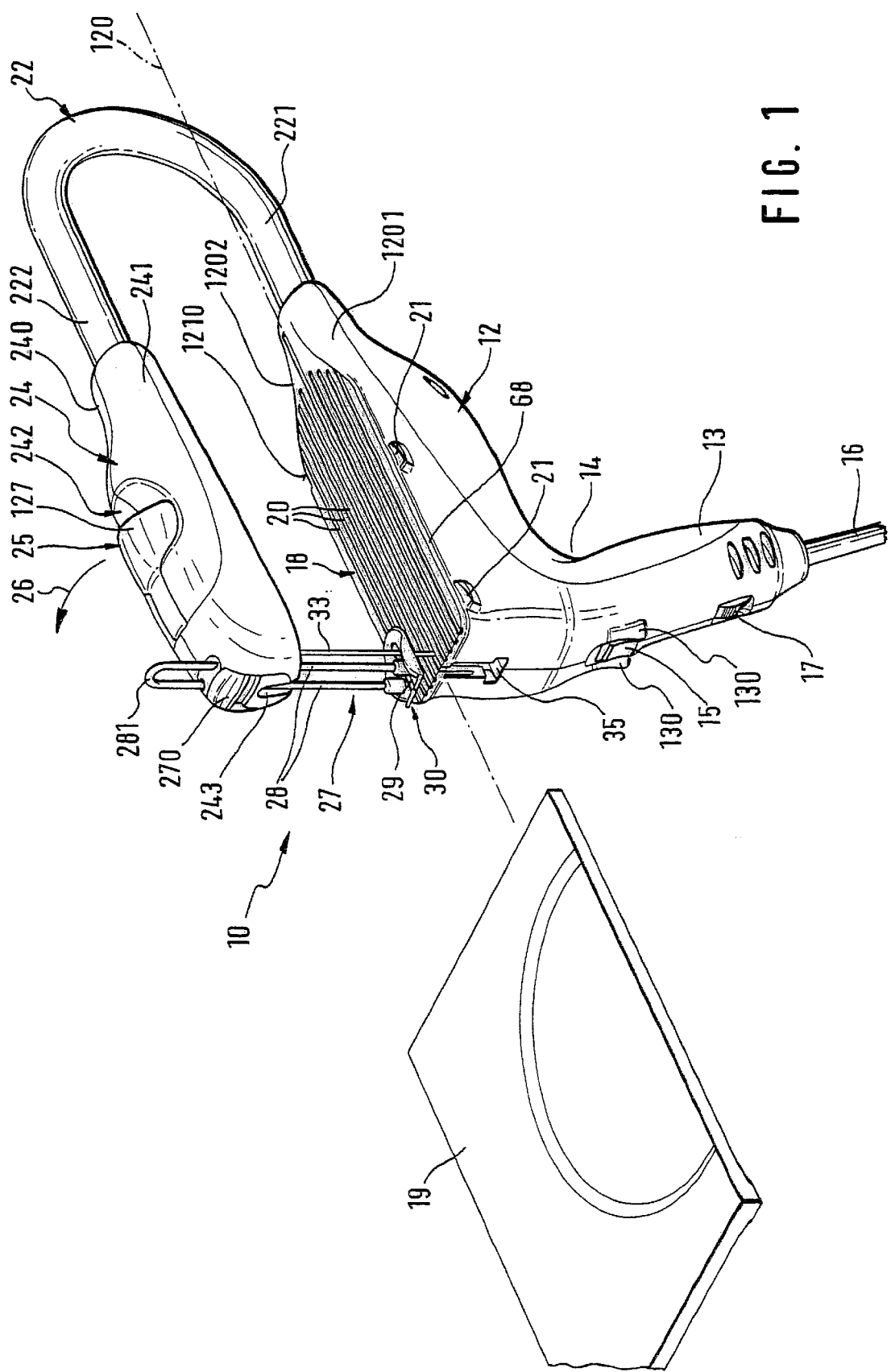

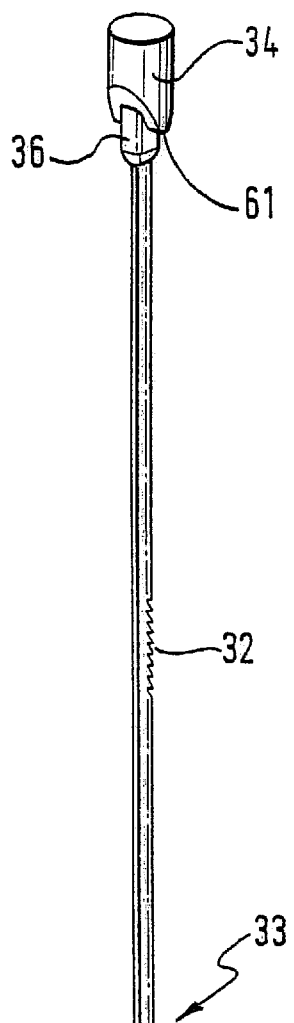
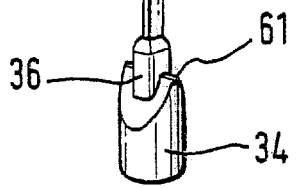
FIG. 12

HAND-OPERATED SCROLL SAWING MACHINE WITH A SUPPORT SURFACE THAT CAN BE DETACHABLY CLIPPED TO A SAWING TABLE

PRIOR ART

The present invention is based on a handheld power fret saw.

From U.S. Pat. No. 5,027,518, a power fret saw of this type is known that in its design is comparable to a fret saw that is actuated manually; the typical U-shaped bracket has a handgrip protruding transversely at the bottom, with a motor housing, and the back side of the grip has a switch for controlling the energy supply to the motor.

Compared with manual fret saws, the known power tool has the advantage that the manual sawing motion is dispensed with.

ADVANTAGES OF THE PRESENT INVENTION

The power fret saw according to the invention has the advantage that it is very light in weight, rests comfortably in the hand, and can be guided by the user in a way that is especially securely controllable.

The safety of manipulation is improved because the pistol-like base housing adjoining the handgrip is lengthened to the rear and in the operating position is braced on the user's forearm.

Because the arms of the U-shaped bracket are multiple times, in particular twice, as long as the power fret saw blade, relatively large-area workpieces can be machined with the fret saw as far as their middle; that is, the maximum cutting depth into a boardlike workpiece measured from its edge inward is approximately 270 mm, which is relatively great.

Because the handgrip has the toggle switch of the on-and-off switch of the motor at the front, this toggle switch is especially easy to manipulate, in particular with the index finger.

Because the base housing receives the motor and drive means for moving the power fret saw blade back and forth, the blades are protected against dust and damage.

Because the upper arm of the bracket, on its free end, carries an end housing that receives clamping and guide means for releasable clamping of the power fret saw blade, these means are especially well protected against dust and damage.

Because the fret saw on the top of its base housing has a flat bearing face, structured with grooves and aligned with the other arm, for bracing a workpiece, the fret saw can be guided in an especially controlled, low-vibration way relative to the workpiece, so that saw cuts can be made virtually as cleanly as with a ruler or protractor.

Because the base housing of the fret saw can be coupled, and in particular locked, releasably to a sawing table that can be secured to a workbench, for instance, and the handgrip protrudes past the sawing table at the bottom in a way that is convenient to grasp, the fret saw with the sawing table secured on it can be used as an especially precisely positionable hand tool or can be used as a stationary tool, in the case of a sawing table flanged to a workbench.

Because the base housing of the power fret saw can be coupled without play to the sawing table via longitudinal guides, in particular discontinuous tongue-and-groove guides, the power fret saw can be inserted from above into the sawing table and combined with it in bayonet mount fashion without an auxiliary tool.

Because the power fret saw can be disconnected from the sawing table by pressing down on an overlockable pushbutton, the power fret saw can be released especially quickly and conveniently without an auxiliary tool.

Because the power fret saw has a workpiece holding-down device that can be displaced parallel to the power fret saw blade and at the same time acts as a finger guard, the workpiece to be machined is fixed in an especially well-controlled way relative to the power fret saw blade, so that precise sawing can be done.

Because the arms of the U-shaped bracket have flat free ends and each carry a leaf spring there, the leaf springs are connected positionally securely to the bracket, resting with their full surface thereon, and a parallel orientation of the two leaf springs to one another is possible for the sake of parallelogram-like guidance of the saw blade with a slight pendulum stroke.

Because the leaf springs on their free ends have a central fork slot, into each of which one fastening end of the power fret saw blade can be suspended releasably, clamping of the power fret saw blade by positive engagement, which is securer than the previously known clamping of power fret saw blades by nonpositive engagement by turning a wing nut, can be attained without tools.

Because the upper leaf springs are bent in a U and are secured with their lower leg, in particular riveted, to the free end of the arm of the U-shaped profile in such a way that the legs point outward in the same direction as the free arms, in which condition the arch and the upper leg of the U are freely pivotable, an elastically prestressed rocker for a parallelogram-like gear, whose counterpart rocker forms the leaf spring secured to the lower arm and for which the saw blade is the coupler, is created especially economically.

Because the lower leaf spring can be coupled to the motor, in particular by positive engagement, via drive means and in particular via a connecting rod, the transmission of the driving force does not take place directly to the saw blade, so that the reversal of motion at the dead center points along the path of motion of the saw blade is damped.

Because the lower leaf spring on its free end has a stamped, downward-curved tab that forms an eyelet for engagement by the connecting rod, an especially economical coupling between the connecting rod and the leaf spring is possible.

Because each leaf spring on each of its free ends has a respective groove extending transversely to the slot, in which groove one nipple of the saw blade can be centered and pivotably braced in articulated fashion, in particular with a knife-edge, the power fret saw blade can be coupled to the swinging leaf springs in an articulated fashion, without warping, in the parallelogram-like gear.

Because the nipples comprise extruded-on plastic and have a square region pointing toward the saw blade that reaches without play through the slot, the fastening ends of the power fret saw blade can be positioned in a securely centered and damped way relative to the leaf springs.

Because the U-shaped bracket comprises metal, in particular tubing of circular or elliptical cross section, and because the base and end housings are of plastic, in particular half housing shells to be put together, it is possible to combine sturdiness, achieved by great stability of the abutments of the power fret saw blade, with a lightweight construction and an ergonomic design of the power fret saw.

DRAWINGS

The invention is described in further detail in terms of an exemplary embodiment in conjunction with the drawing.

Shown are

Figure 2:
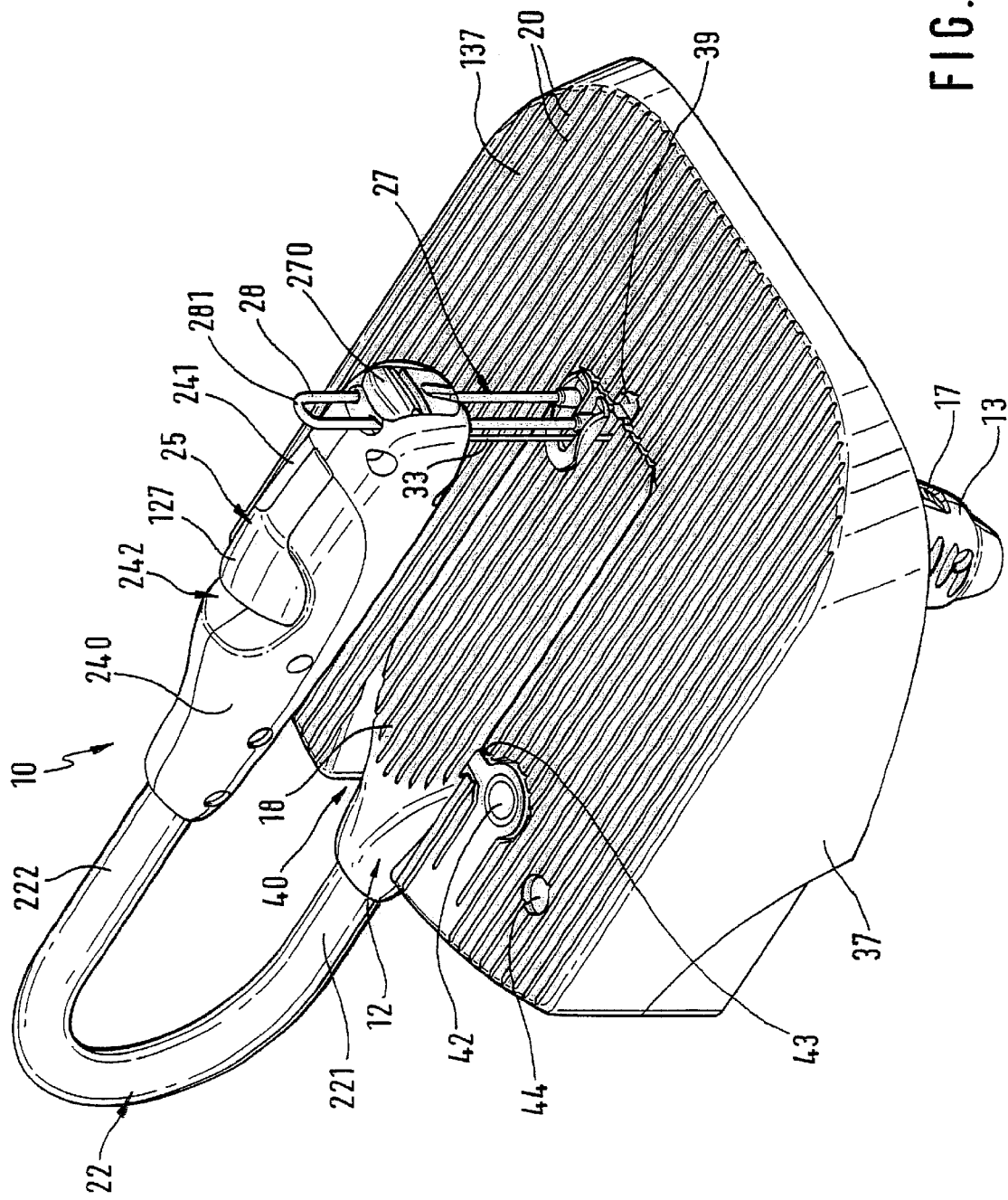
Figure 3:
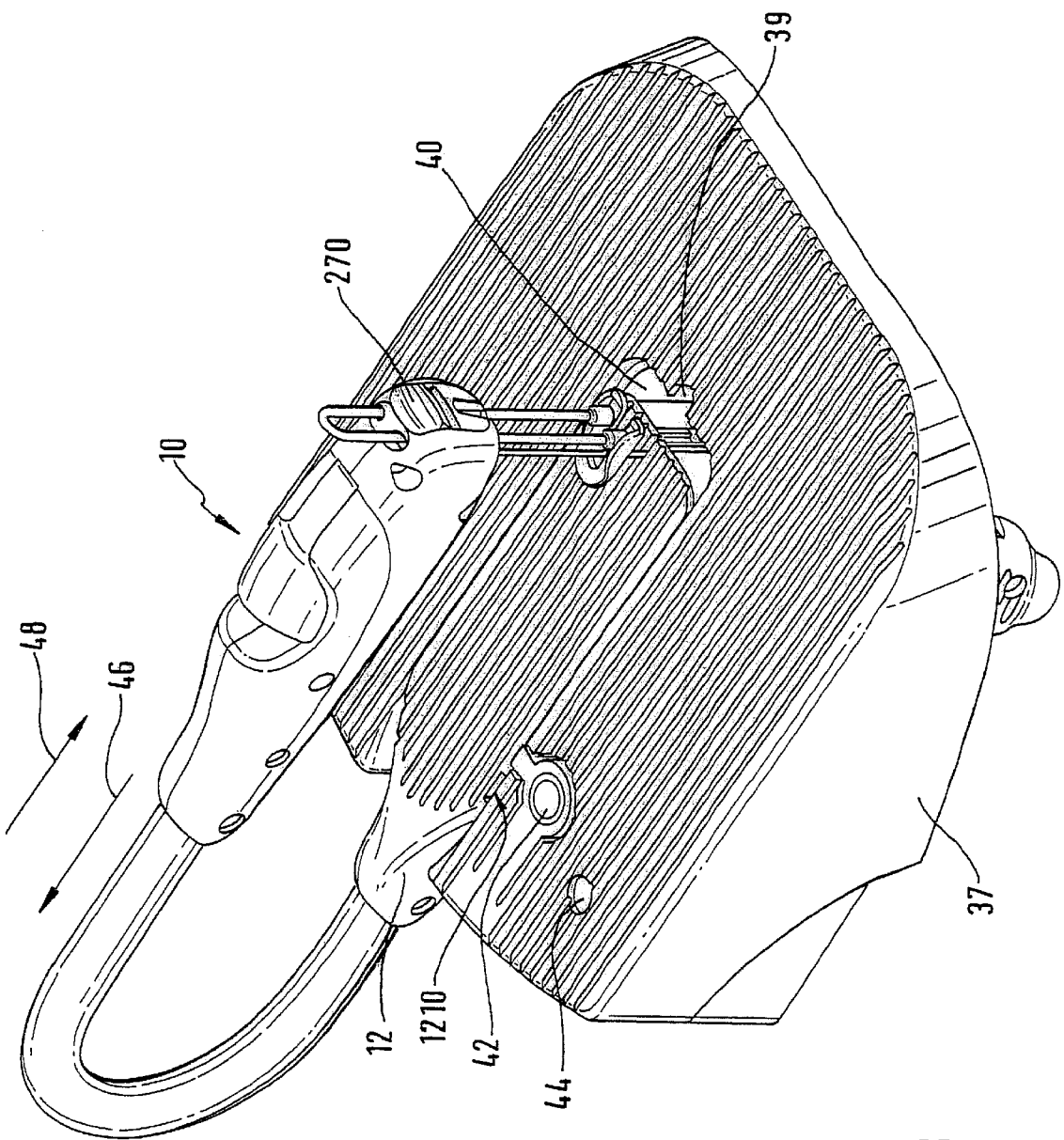
Figure 4:
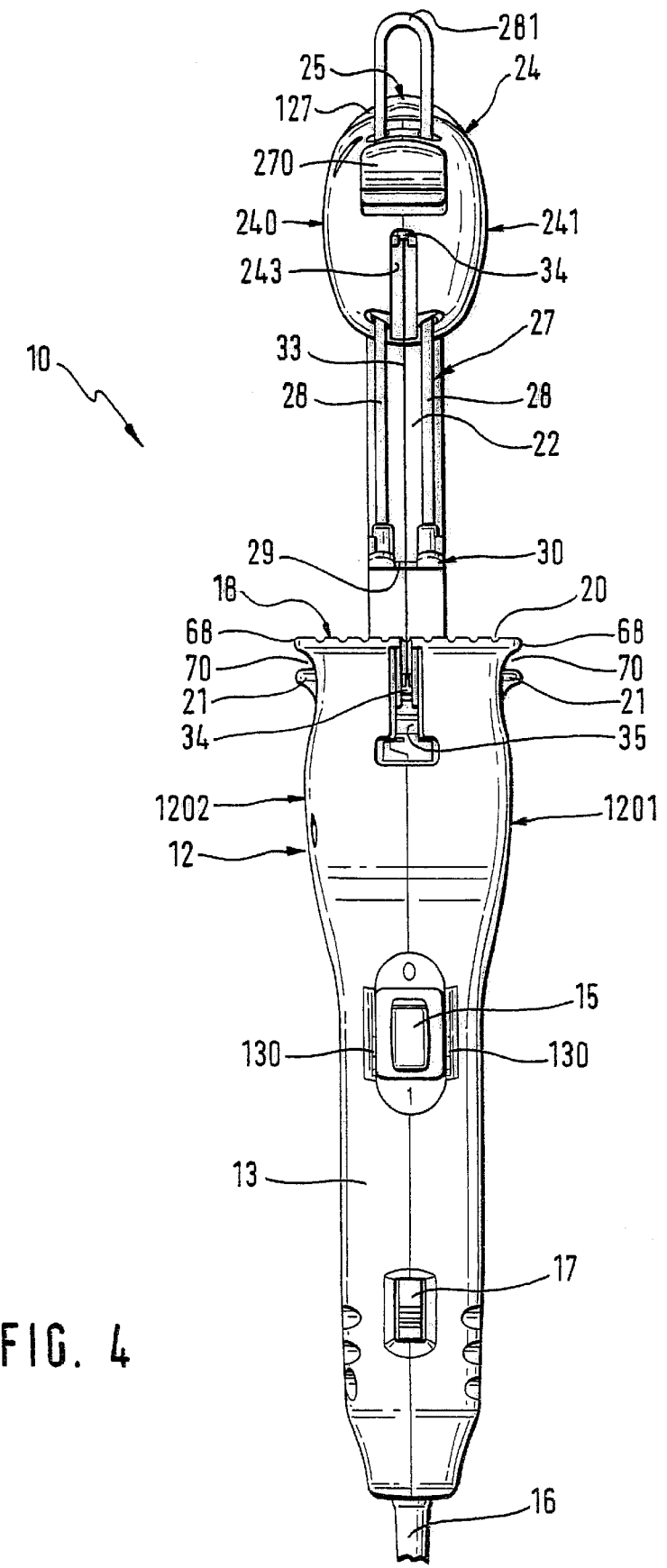
Figure 5:
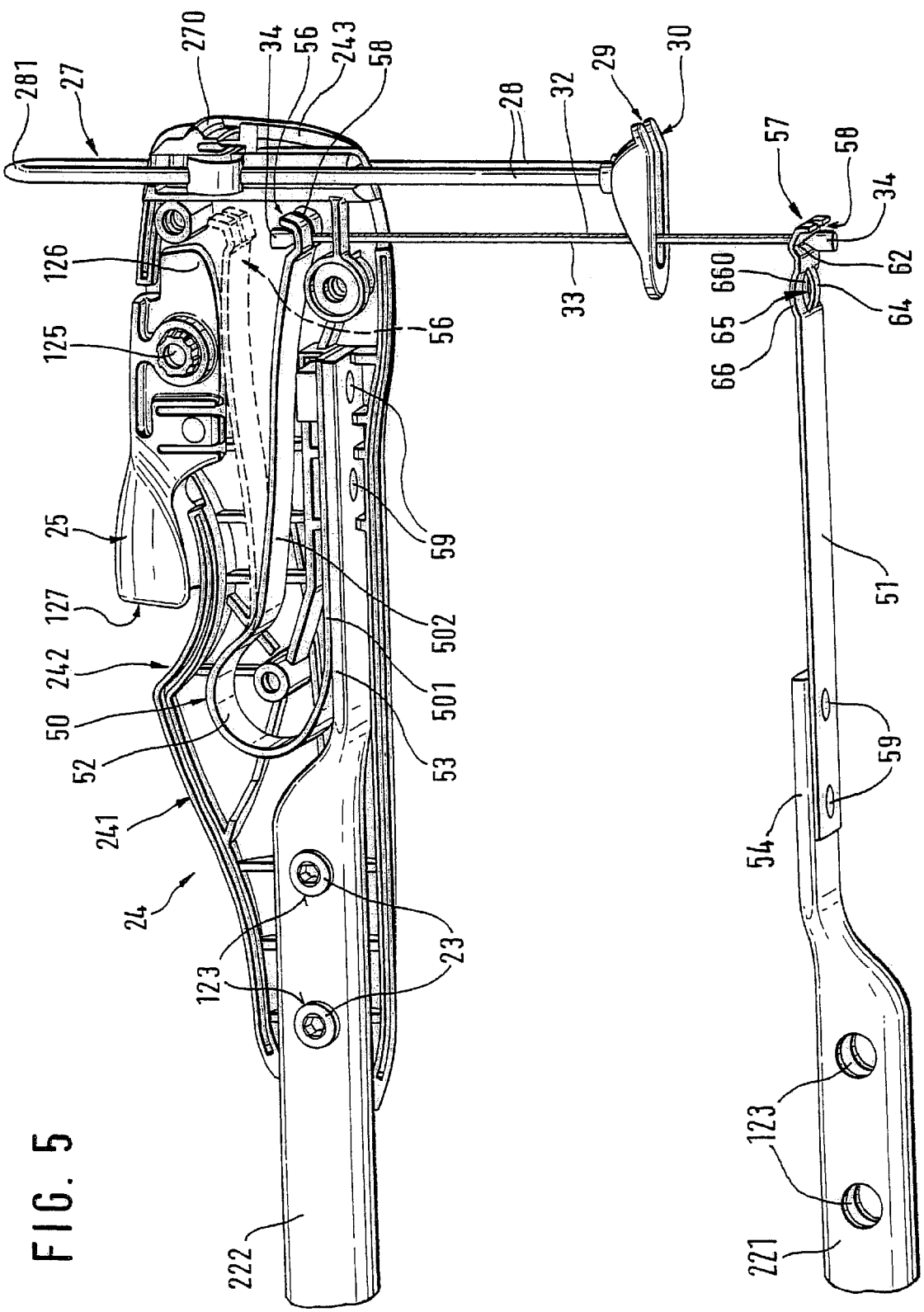
Figure 6:
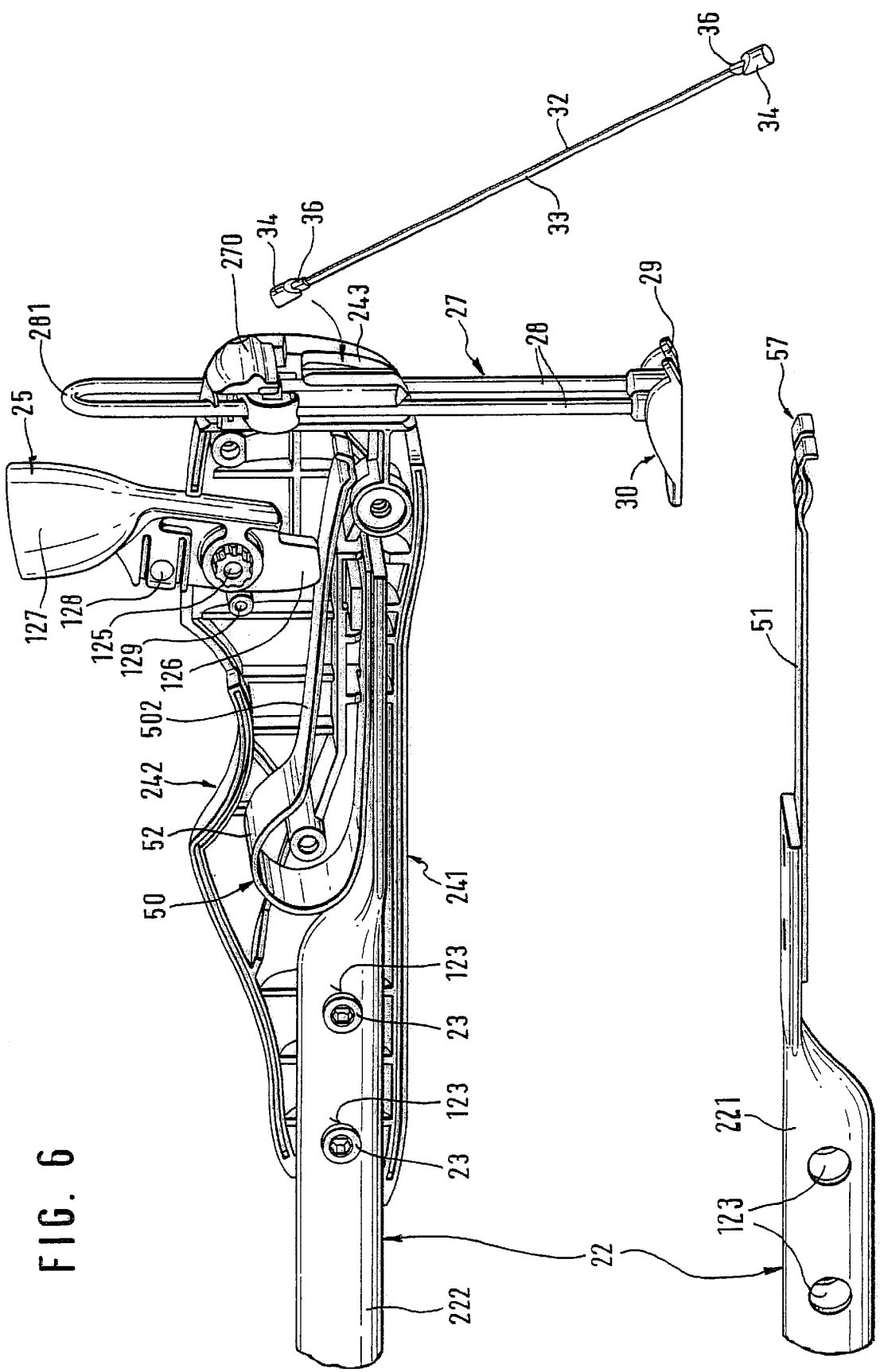
Figure 7:
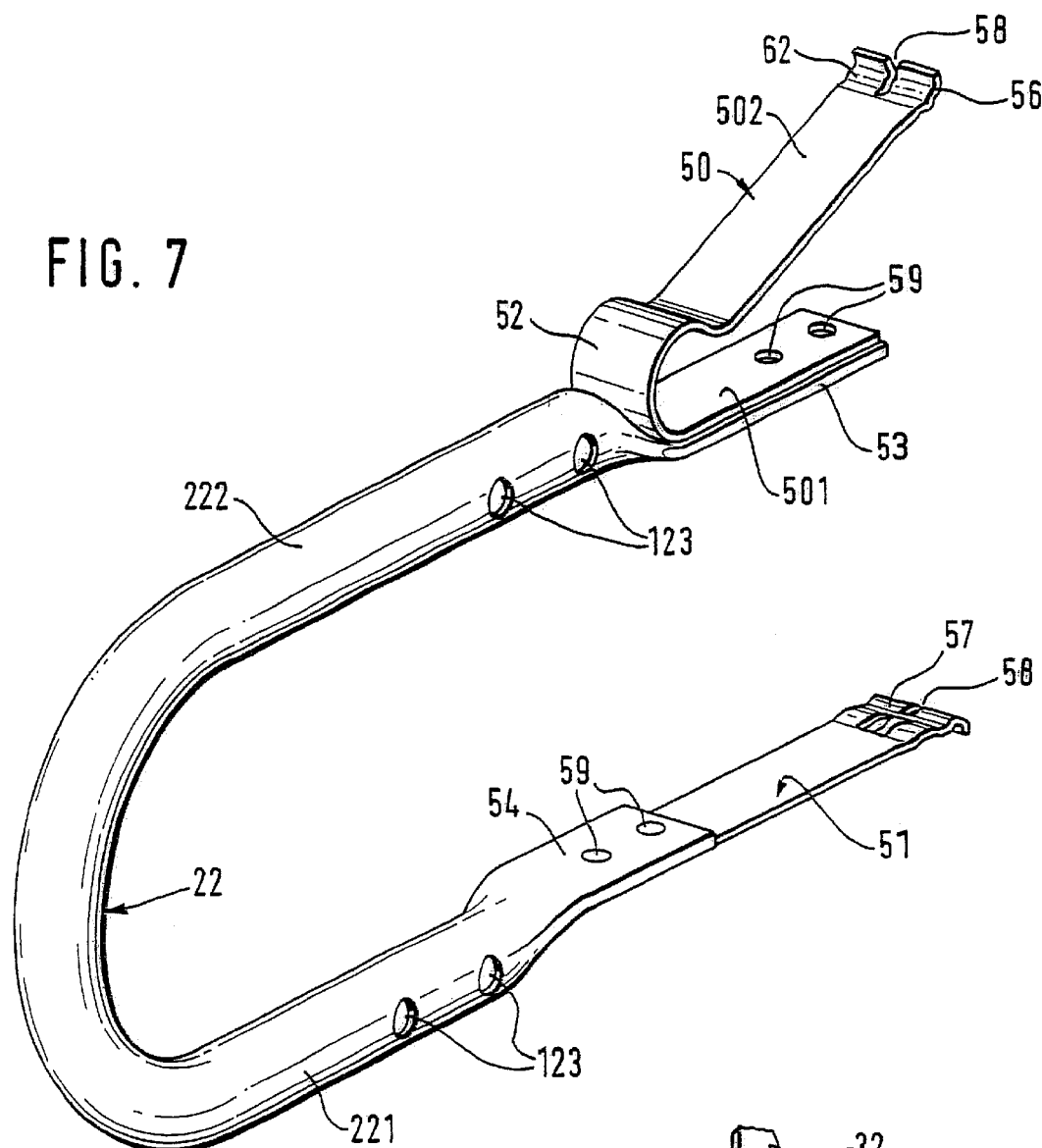
Figure 8:
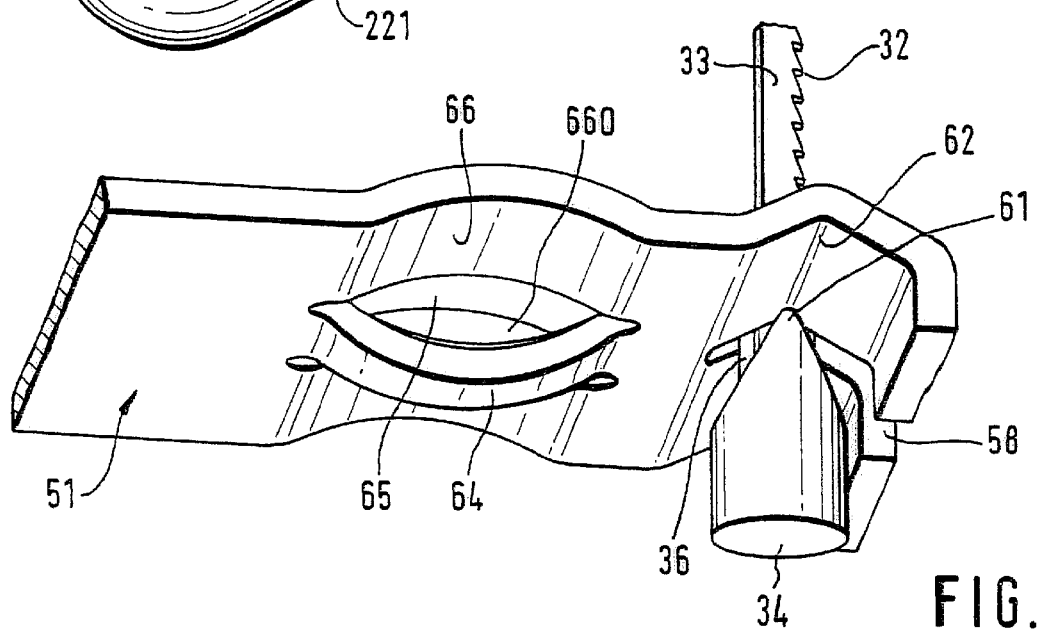
Figure 9:
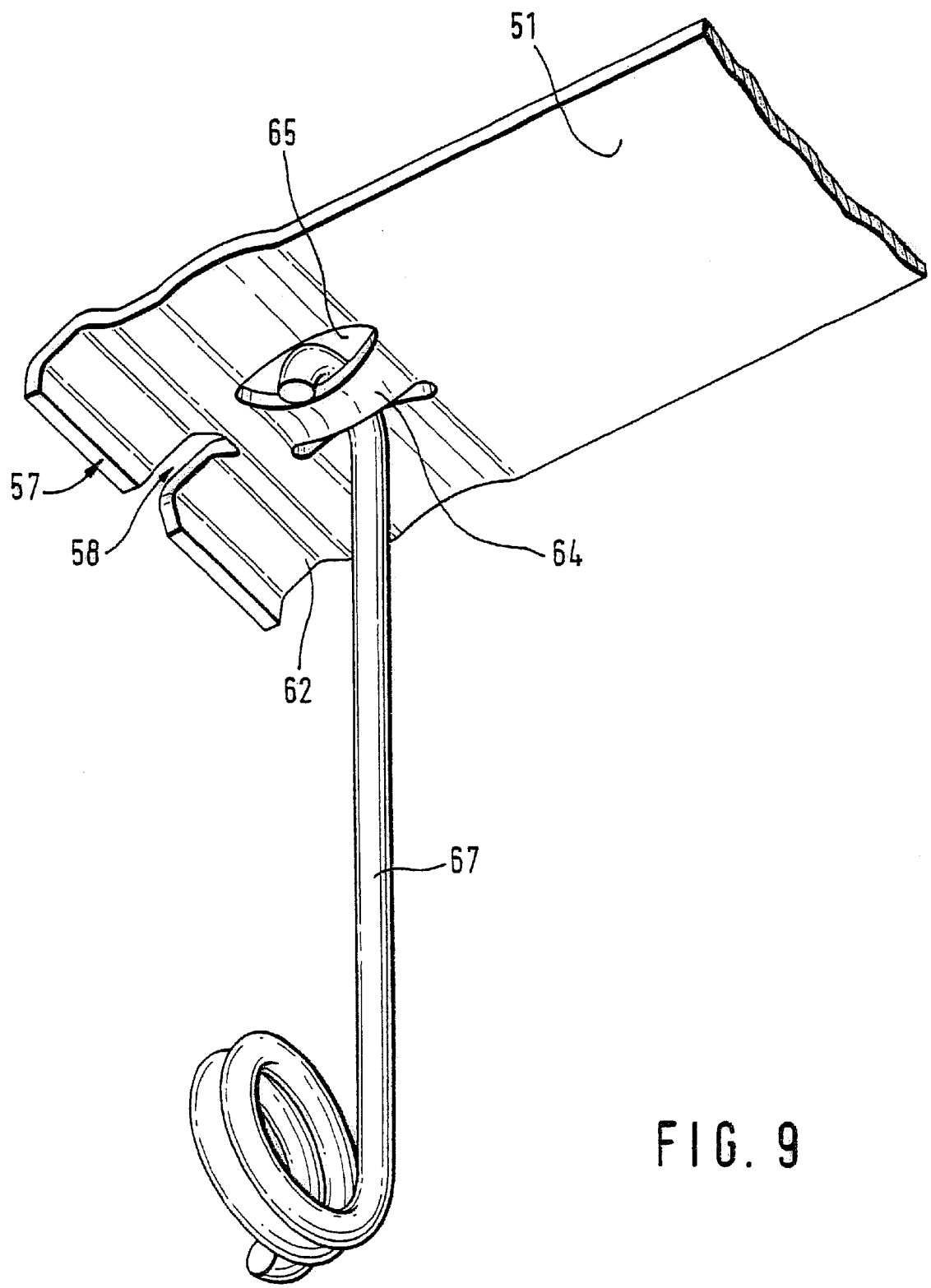
Figure 10:
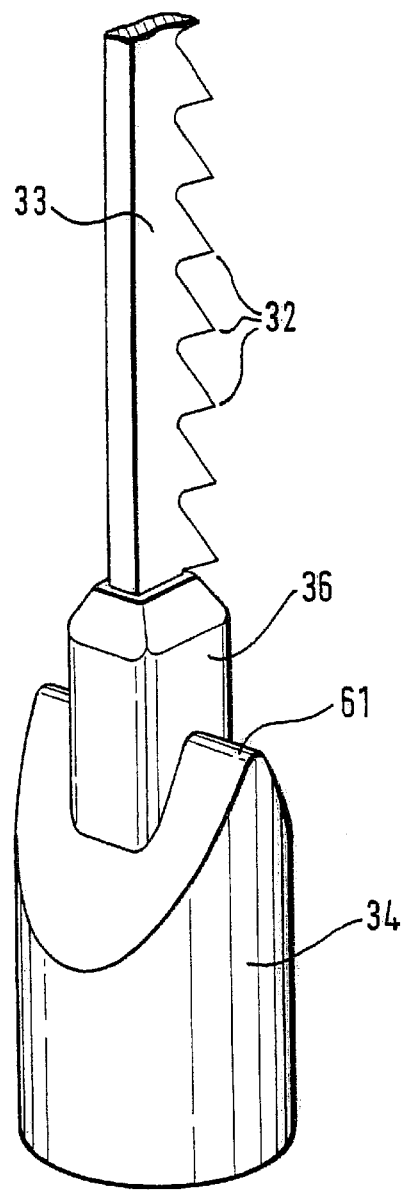
Figure 11:
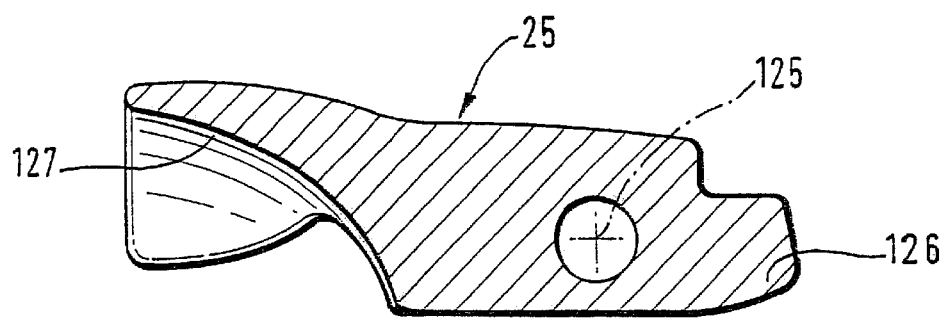
Figure 13:
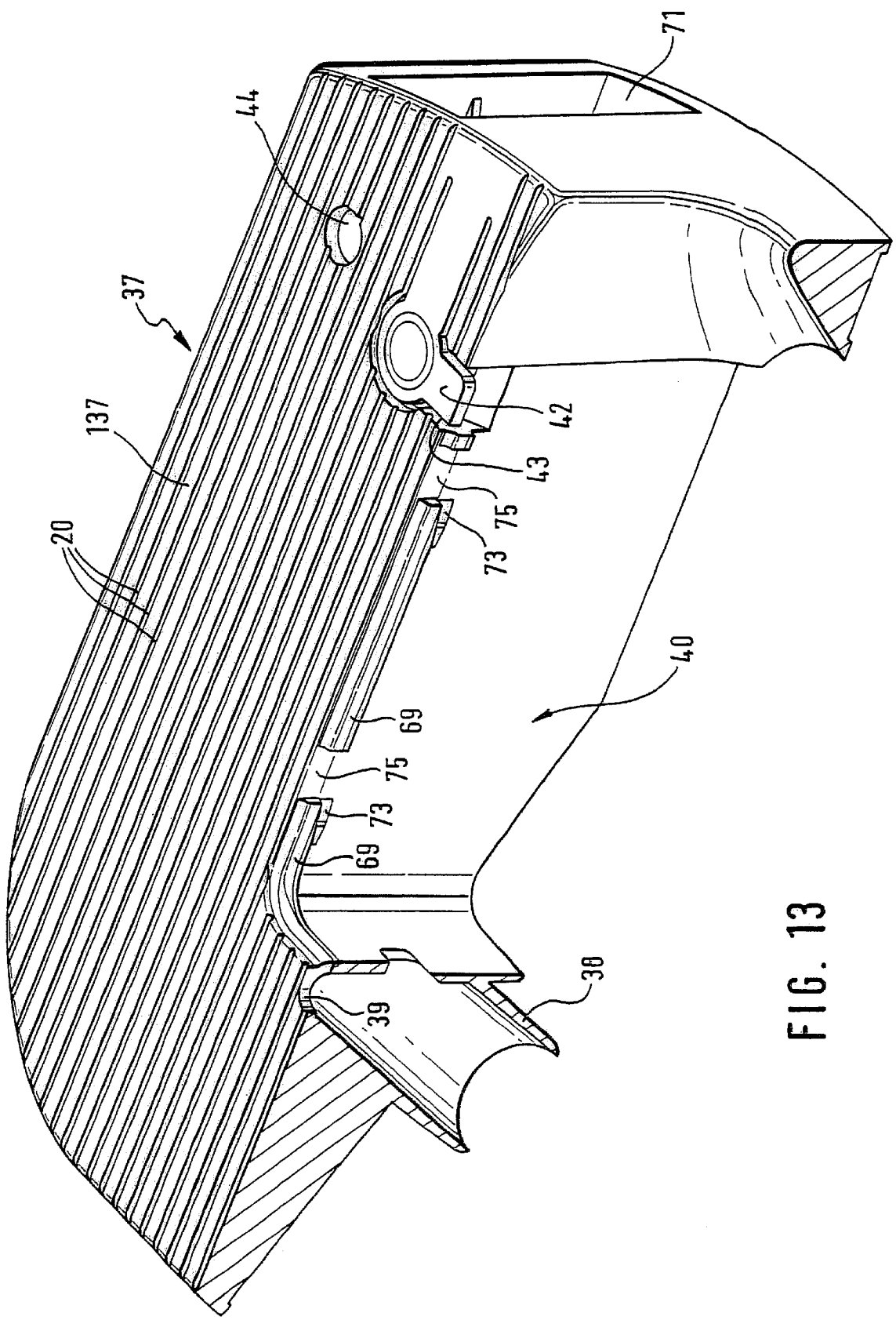
Figure 14:
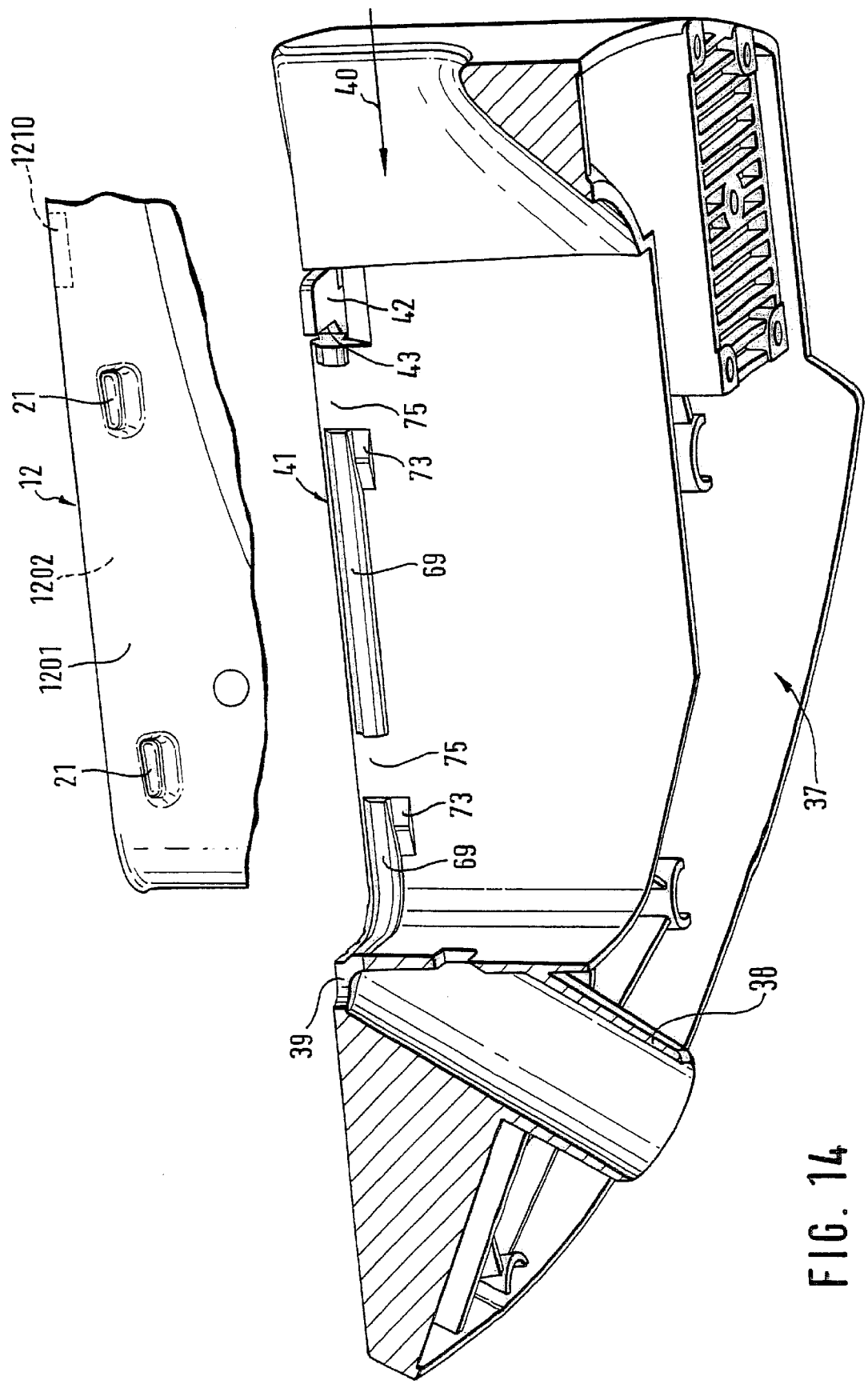
Figure 15:
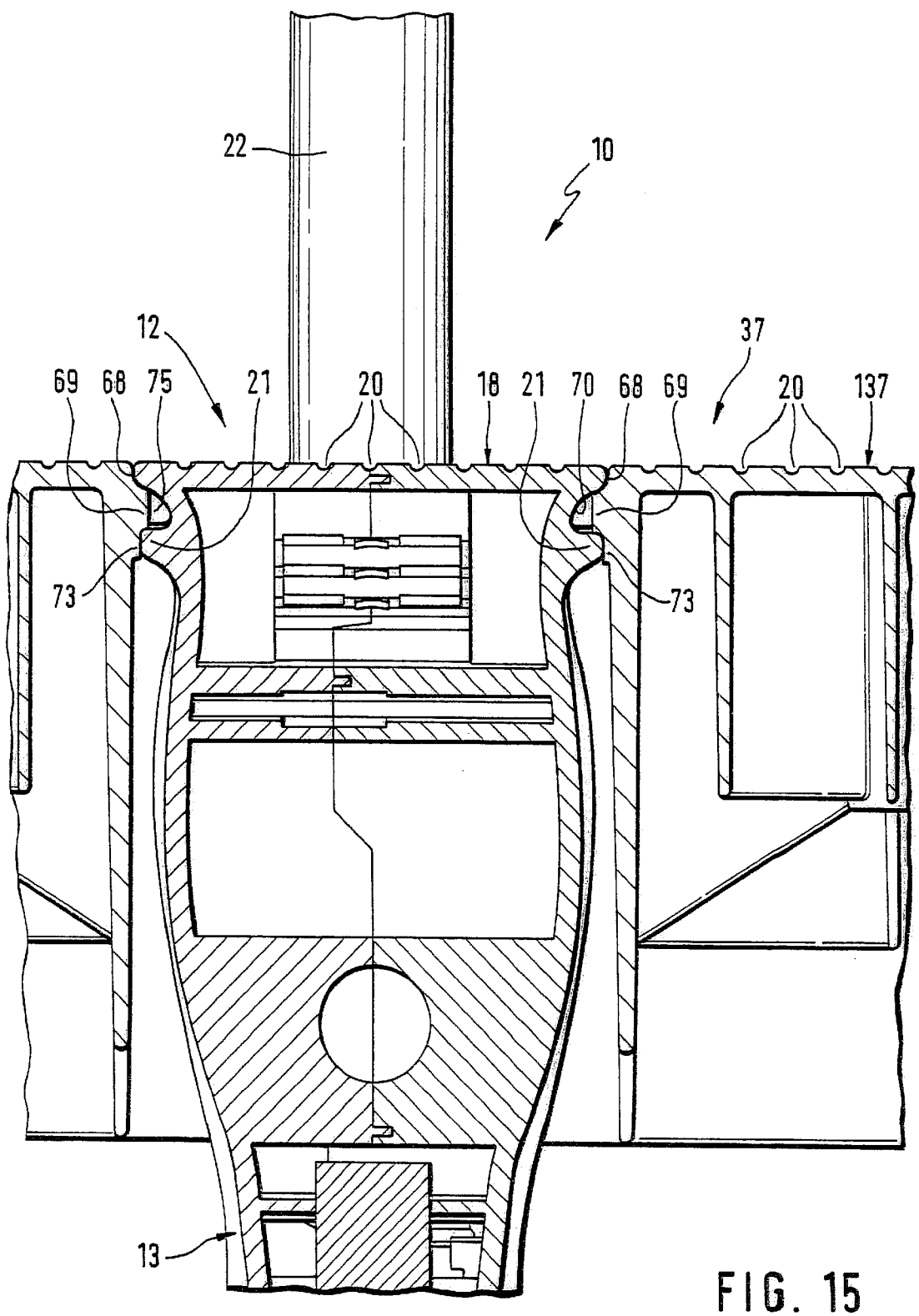
Figure 16:
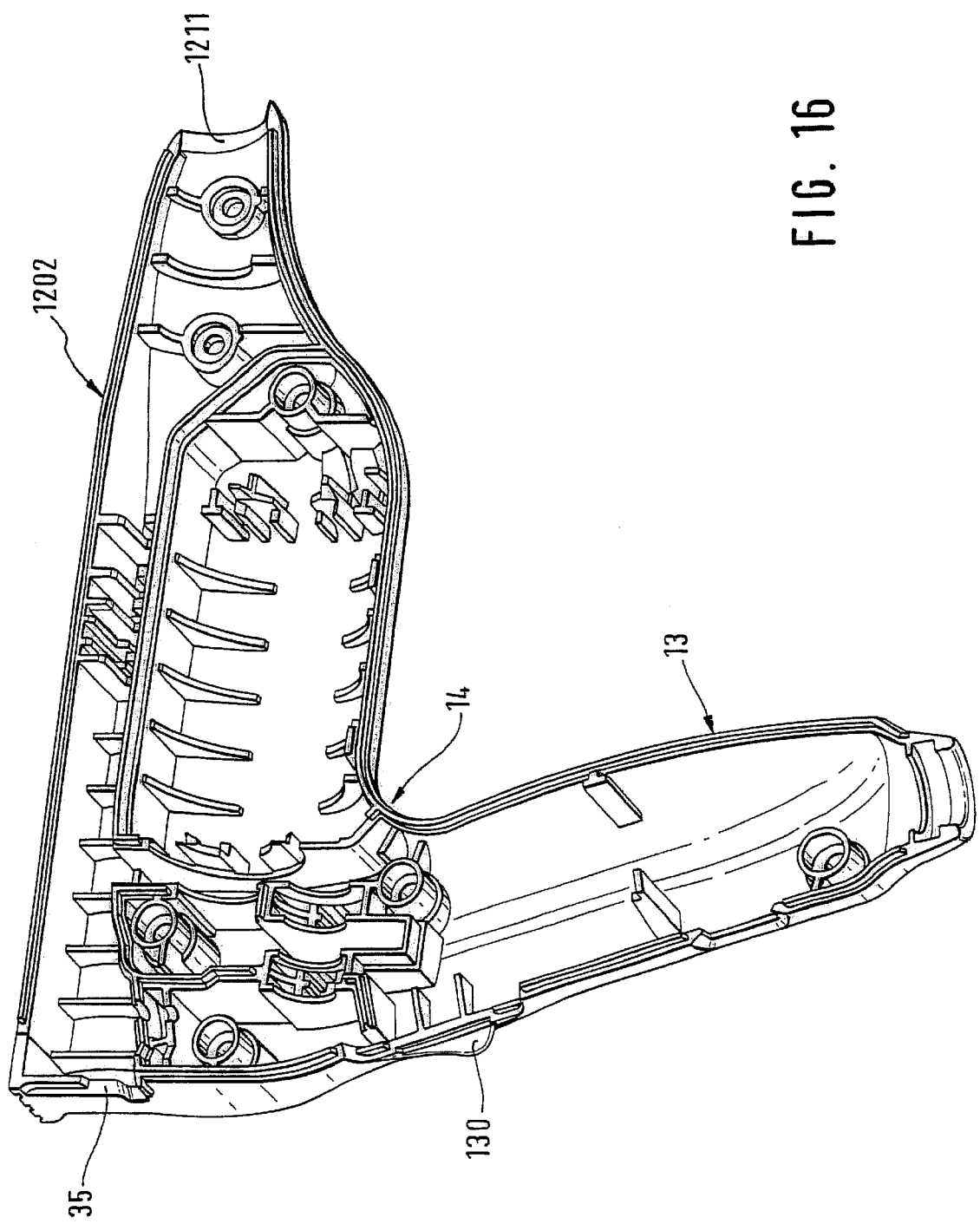

FIG. 1, a three-dimensional view of the handheld power fret saw according to the invention, seen from the front left;

FIG. 2, the power fret saw, locked to a sawing table, of FIG. 1, seen from the front right;

FIG. 3, the power fret saw of FIG. 2 immediately before the sawing table is locked;

FIG. 4, the power fret saw seen from the front;

FIG. 5, a three-dimensional view from the right, with the end housing removed or opened;

FIG. 6, the view of FIG. 5 from above with the clamping lever pivoted into the release position;

FIG. 7, the U-shaped bracket with the leaf springs shown as a detail;

FIG. 8, the lower leaf spring with the power fret saw blade suspended in it;

FIG. 9, the view from below of the lower leaf spring with the connecting rod;

FIG. 10, the fastening end of the power fret saw blade;

FIG. 11, the detail of the clamping lever;

FIG. 12, the saw blade as a detail;

FIG. 13, a sectional view of the sawing table;

FIG. 14, a three-dimensional exploded view of the sawing table with the corresponding region of the housing of the power fret saw;

FIG. 15, a detail of the cross section of the base housing with the coupled sawing table;

FIG. 16, the view from inside of the right half-shell of the base housing; and

Figure 17:
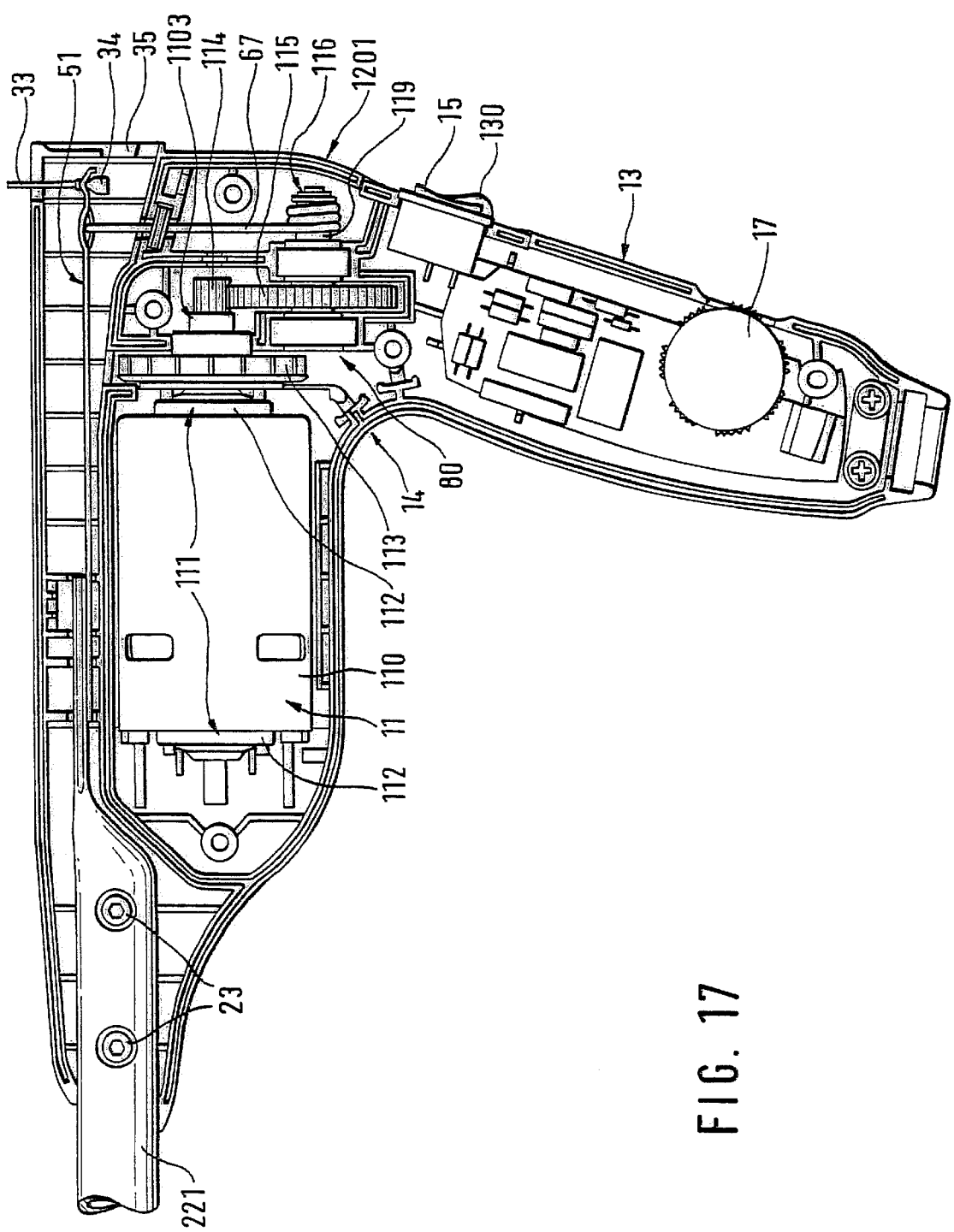

FIG. 17, the left half-shell with the motor and gear mounted.

DESCRIPTION OF THE EXEMPLARY EMBODIMENT

The power fret saw 10 shown in FIG. 1 comprises a pistol-shaped lower base housing 12 with a handgrip 13 protruding transversely downward. From the region where it emerges from the base housing 12, the handgrip 13 is disposed such that it is angled toward the rear. The rear contour of the handgrip 13 in the region where it emerges from the housing 12 forms a concavely curved throat 14, which is extended horizontally to the rear in the form of a lower outer contour of the base housing 12. The throat 14 conforms to the user's hand and there rests on or is fastened in the hand approximately in the middle between the thumb and the index finger. The horizontally extending rear region of the base housing 12 is braced on the back of the hand and the forearm of the user and forms a lengthened support lever, so that as a result, the fret saw 10 can be manipulated in an especially well-controlled way during sawing.

On the front, the handgrip 13 has a toggle switch 15, which emerges from the handgrip 13 and is framed narrowly on the sides by luglike protrusions 130 in order to interrupt or close the circuit. A power cord 16, disposed in the interior of the base housing 12, for supplying energy to the motor, not shown, emerges from the handgrip 13 at the bottom.

A control wheel 17 of an electronic regulating system, not shown, for adjusting the rpm of the motor is disposed below the toggle switch 15.

The base housing 12 comprises two longitudinally split half-shells 1201. 1201, which are split along a longitudinally extending line 120, and on the top has a flat, level bearing face 18, on the order of the deck of a ship with longitudinal grooves 20, and a workpiece 19 can be braced on this bearing face for machining.

The base housing 12, below an encompassing outer edge 68, has two spaced-apart clamping clips 21 on both sides; of these clips, only the two on the left side can be seen in the drawing.

A lower arm 221 of a U-shaped bracket 22, which comprises bent tubing and is tightly gripped by the half-shells 1201, 1202 emerges toward the rear of the base housing 12. The lower arm 221 merges in curved fashion toward the top and front with an upper arm 222 extending parallel to the lower arm 221. This upper arm 221, on its free end pointing forward, has an end housing 24, which is fixed to the arm 222 via fastening screws 23 (FIGS. 5, 6) and which comprises two longitudinally split housing shells 240, 241. The end housing 24 has a clamping lever 25 which is accessible from above and whose grip 127 can be grasped from below with the finger of the user's hand by means of a depressionlike or notchlike indentation 242 and can be pivoted upward for opening in the direction of the actuation arrow 26.

On its rounded front end, the end housing 24 carries a workpiece holding-down device 27, which comprises two round sliding rods 28 that are supported displaceably in the end housing 24 in such a way that they can be locked relative to the lower housing 12. The two sliding rods 28 protrude at the top past the end housing 24 and are joined together by a U-shaped bracket 281. The sliding rods 28, on their lower free end oriented toward the bearing face 18, have a footlike stop 30, which extends to the rear parallel to the bearing face 18 in the manner of a horseshoe, with a slot 29 open at the front, in which slot a power fret saw blade 33, which points toward the front with its row of teeth 32 (FIGS. 5, 6), is guided laterally and from behind or secured against excessive lateral or rear-oriented deflection.

The workpiece holding-down device 27, after its push-button 270 protruding from the end housing at the front, has been depressed, can be displaced upward out of its locking position.

The power fret saw blade 33 has two fastening ends (FIGS. 5, 6), which are embodied as injection-molded plastic nipples 34 and which markedly increase the diameter of the saw blade 33 at its fastening ends, so that these ends can be suspended and thus clamped in forklike abutments 56, 57 (FIGS. 5, 6).

The end housing 24, on its front region below the push-button 270, has a slotlike mounting window 243, through which the fastening end of the saw blade 33, embodied as a nipple 34, can be suspended in its upper abutment 57. Corresponding to this, the base housing 12 has a front mounting slot 35, through which the lower fastening end of the power fret saw blade 33 can be suspended, in the form of a second nipple 34.

FIG. 2 shows the power fret saw 10 from the top right, coupled to a sawing table 37 whose upper, flat, level bearing face 137 merges flush with the bearing face 18 of the base housing 12; the grooves 20 of the bearing faces 137, 18 merge in regular fashion with one another.

The sawing table 37, on its front, has a vacuum cleaning stub 38 (FIGS. 13, 14) that emerges at the bottom and that at the top in the region of the bearing face 137 opens into a suction hole 39, through which saw chips formed during sawing can be removed by suction when a suction hose of a vacuum cleaner or the like is connected to the vacuum cleaning stub 38.

On the middle in its rear region, the sawing table 37 has a U-shaped recess 40 that is continuous toward the bottom and leads into the bearing face 137 and that corresponds to the outer contour or outer edge 68 of the bearing face 18 of the base housing 12. On the top, on opposed sides, the recess 40 has longitudinal guides 69, 73 (FIG. 13), which enable latching the base housing 12 of the power fret saw 10 into the sawing table 37 in the manner of a bayonet mount and make it possible to be held therein without play.

A locking button 42 forms a detent stop 43, which engages a corresponding recess 1210 of the base housing 12 near the bearing face 18 and firmly holds the base housing 12 and thus the power fret saw 10 releasably relative to the sawing table 37.

The bearing face 137 of the sawing table 37 is penetrated vertically downward by screw holes 44, spaced equally apart toward the outside, through which screws can be inserted with which the sawing table 37 can be screwed to a solid underlay, such as a workbench or the like. Furthermore, on its outer edge at the back, the sawing table 37 has clamping openings 71 (FIG. 13) for the insertion of a clamping jaw of a screw vise, not shown, with which it can be secured to a solid underlay.

The handgrip 13 protrudes beneath the sawing table 37, so that the power fret saw 10 with the sawing table 37 mounted can be used jointly as a hand tool. Thus the power fret saw 10 can be oriented especially comfortably relative to the workpiece 19 in such a way that the workpiece is positioned perpendicular to the saw blade 33 or to the bearing face 18, 137.

FIG. 3 shows the power fret saw 10 upon release of the sawing table 37, or shortly before the power fret saw is latched into or locked to the sawing table. It can be seen from this that the base housing 12, for final locking or release, must be displaced relative to the sawing table 37, parallel to its bearing face 137.

Before that, the base housing 12 of the power fret saw 10 must be inserted vertically from above into the recess 40, so that the clamping clips 21 and the outer edge 68 of the housing 12 can come into the engagement position with the corresponding guide springs 69, 70, 73 of the sawing table 37.

The arrows 46, 48 indicate the direction for releasing or fastening the power fret saw 10 with regard to the sawing table 37 after the vertical insertion of the base housing 12 into the recess 40.

FIG. 4 shows a front view of the power fret saw 10, in which the cross section or contour of the base housing 12 that is relevant in terms of coupling to the sawing table 37 is shown especially clearly along with the clamping clips 21 and the outer edge 68. The mounting slot 35 and mounting window 243 and other details, identified by reference numerals, from the previous drawing figures can also be seen and need not be repeated again here.

FIG. 5 shows the front regions of the upper and lower arms 221, 222 of the U-shaped bracket 22 without the base housing 12, showing only the left half-shell of the end housing 24 and the clamping mechanism for releasing or fastening the power fret saw blade 33.

The lower arm 221, on its free end, has a horizontal flat face 54, to which a flat leaf spring 51 is fastened, especially riveted, at fastening points 59. On its free end 57 acting as an abutment for the fastening end of the saw blade, the leaf spring 51 has a middle fork slot 58 for the passage therethrough of the saw blade 33 and for firmly restraining the nipple 34 of the saw blade. The free end 57 of the lower leaf spring 51 is angled downward at the outermost end—and adjoining that in gabled fashion at the top toward the rear—so that on the underside of the gabled angled feature in the transverse direction a groove 62 is formed, in which a knife-edge 61 of the nipple 34 (FIG. 8) is braced in such a way that it can swing back and forth in articulated fashion. Following the gable-shaped region, the free end 57 of the lower leaf spring 51 continues in the form of a short, flat, level region, which is adjoined by an upward-oriented arch 66 with a central longitudinal slot 660 that is formed by stamping or embossing of a downward-curved tab 64. The arch 66 and the tab 64 together form an oval eyelet 65 in which a connecting rod 67 (FIG. 9) can be suspended; the connecting rod converts the rotary motion of the motor into an up-to-down motion of the lower leaf spring 51.

The left-hand shell 241 of the end housing 24 is secured to the upper arm 222 of the bracket 22 by means of fastening screws 23. The free end of the upper arm 222, like that of the lower arm 221, also forms a horizontal flat face 53, on the top side of which the upper leaf spring 50 is secured, in particular riveted, at fastening points 59.

The upper leaf spring 50, with its legs 501, 502, extends outward in the form of a U that is open on the right—like the free end 53 of the upper arm 222; the lower, short leg 501 is fastened to the arm 222. The legs 501, 502 are joined to one another by an arch 52.

The free end 56 of the upper, longer leg 502 of the leaf spring 50 is angled upward on the free end and then adjoining that is shaped like a V downward—in mirror symmetry to the outer end 57 of the lower leaf spring 51—and there again forms a groove 62, which in the same way is penetrated beyond its center by a middle fork slot 58, so that the saw blade 33 with its other nipple 34 is pivotably supported in the fork slot 58, or in the groove 62 of the V-shaped region, in mirror symmetry to the lower fastening end 36 of the saw blade 33.

Near their free ends, the arms 221, 222 have through holes 123, which extend transversely to the plane defined by the bracket 22 and allow the fastening screws 23 to pass through them so that the base and end housing 12, 24, and in particular their half-shells, can be fastened.

Associated with the upper leg 502 of the upper leaf spring 50 is a clamping lever 25 embodied as a two-armed lever, which can be pivoted upward with its grip 127 about a pivot shaft 125 in the end housing 24, so that its cam 126 moves downward and in the process carries the upper leg 502 of the leaf spring 50 with it toward the lower arm 221. For the sake of better engagement of the user's finger, the grip 127 of the clamping lever 25 is a tubular hollow body, open toward the rear, which the user can comfortably engage with one finger, guided by an indentation 242 in the outer contour of the end housing 24, and pivot upward.

FIG. 5 also shows the front region of the end housing 24 with the workpiece holding-down device 27. The sliding rods 28 of the workpiece holding-down device carry the footlike stop 30 with a central slot 29 below the end housing 24. The horseshoe-shaped design of the stop 30 can be seen, for the sake of gripping the saw blade 33 from the sides and rear. The pushbutton 270 can also be seen, by the depression of which the locking of the holding-down device 27 or of the sliding rods 28 can be undone—in the upward direction. The holding-down device 27 is convenient to adjust with the user's hand by pushing the curve 281 up or down.

The position of the clamping lever 25 is shown in the clamping position, in which it dips into the concave indentation and thus extends flush with the outer contour of the end housing 24. The upper leaf spring 50 is shown only in dashed lines in the upper dead center position, that is, the clamping position, while it is shown in solid lines in the release position for changing the saw blade 33.

FIG. 6 shows the same details as FIG. 5, but the clamping lever 25, pivoted with its grip 127 upward and its cam 126 downward, presses the upper leg 502 of the leaf spring 50 downward. The concave indentation 242 for flush engagement of the grip 127 with the inside of the outer contour of the end housing 24 is clearly seen. Furthermore, a detent pin 129, adjacent to the pivot shaft 125, of the housing shell 241 is shown, into which a hollow-cylindrical detent opening 128 of the clamping lever 25 can snap once the release position is attained. The saw blade 33 is released from the abutments or the free ends 56, 57 of the top and bottom leaf springs 50, 51 and has been removed toward the front or is ready for reinsertion into the abutments. To that end, the mounting window 243 in the end housing 24, or the mounting slit 35 (FIG. 1) in the base housing 12, must be penetrated.

FIG. 7 shows the U-shaped bracket 22, made of metal tubing of round cross section, with the leaf springs 50, 51 riveted to it; the free end 56 of the top leaf spring 50 with the longitudinally extending fork slot 58 or with the groove 62 is seen especially clearly, as is the flat, level, parallel orientation of the upper and lower flat faces 53, 54 of the upper and lower arm 222, 221, without a need to repeat the other details identified by reference numerals—and already described in conjunction with the previous drawing figures.

FIG. 8, in an enlarged view, shows the free end 57 of the bottom leaf spring 51 with the fork slot 58, the throat 62, the tab 64, the arch 66, the eyelet 65, and the slot 660. It can be seen that the nipple 34 of the power fret saw blade 33 is pivotably supported in pendulum fashion with its knife-edge 61 in the groove 62; the power fret saw blade 33 passes through the fork slot 58 with a square 36, or its row of teeth 32, adjoining the knife-edge 61. The plastic nipple 34 is supported without play in the fork slot 58 because after the knife-edge 61 it continues in the form of a square 36, which extends far past the knife-edge 61 and embraces the saw blade 33 on all sides. The square 36 also serves the purpose of electrically insulating the saw blade 33 from the motor or the gear.

FIG. 9 shows a bottom view of the free end 57 of the bottom leaf spring 51; the fork slot 58, groove 62, tab 64, and the eyelet 65 or longitudinal slot 660 can be seen, which a connecting rod 67 engages in hook-like fashion, the connecting rod being set into a reciprocating or up-and-down motion by the motor, not shown.

FIG. 10 shows the nipple 34, which extends cylindrically on the outermost end of the power fret saw blade 33 and which, by means of two gable-shaped inclines toward the other nipple 34 forms the knife-edge 61, from which the square region 36 emerges that supports the power fret saw blade 33 without play, secured against twisting in the fork slot 58 of the leaf springs 50, 51.

FIG. 11 shows the detail of the clamping lever 25, embodied as a two-armed lever, one arm of which is designed as a hollow grip region 127 and the other arm of which is designed as a cam 126, between which arms the pivot shaft 125 is disposed.

FIG. 12 shows the detail of the power fret saw blade 33 with the fastening ends, embodied as nipples 34, along with the gable-shaped inclines, knife-edges 61 and square regions 36 thereof.

FIG. 13 shows a three-dimensional fragmentary longitudinal section through the sawing table 37; the vacuum cleaning stub 38, the suction hole 39, the recess 40, the locking button 42 with the detent stop 43, the screw hole 44, and the grooves 20 can be seen. Also visible are guide springs 69, acting as a longitudinal guide for the base housing 12, with interruptions 75 and lateral ramps 73 and with an access opening 71, on the outside at the back, for the clamping jaw of a screw vise, for securing the sawing table to an underlay such as a workbench or the like. In stationary operation of the fret saw 10, the saw blade 33 can be introduced into the lower abutment, so it can be changed, through the suction hole 39.

The interruptions 75 in the guide springs 69 allow the vertical entrance of the lateral clamping clips 21 of the base housing 12 of the power fret saw 10 from above into the recess 40 so that the guide springs 69 can be grasped from below and laterally supported on the ramps 73.

The mode of operation of the bayonetlike clip-in system between the base housing 12 and the sawing table 37 is shown clearly again in FIG. 14, in a lateral fragmentary section seen obliquely from below. The guide springs 69, their interruptions 75, the ramps 73 embodied in wedgelike fashion on the inside, and the locking button 42 in the detent stop 43 are clearly visible. Elements that should also be emphasized are the vacuum cleaning stub 38, the suction hole 39, and the recess 40, and in exploded fashion—seen from above—the side region of the base housing 12 with the clamping clips 21 and the upper outer edge 68 of the base housing 12 for engagement of the recess 40 of the sawing table 37.

FIG. 15, in a cross section of the base housing 12 with the sawing table 37, shows the bayonet-mountlike clamping system between the base housing 12 and the sawing table 37. It can be seen how the guide springs 69 are braced laterally and vertically between the longitudinally extending outer edge 68 and the clamping clips 21, and it can also be seen that a guide groove 70 for the entrance of the guide springs 69 is formed between the clamping clips 21 and the outer edge 68.

Also clearly visible are the ramps 73, which are braced laterally against the clamping clips 21 and which assure a horizontal, play-free mounting of the base housing 12 on the sawing table 37.

The grooves 20 in the bearing face 18 of the housing 12 and in the bearing face 137 of the sawing table 37 can also be seen, as can the fact that the handgrip 13 protrudes at the bottom from the sawing table 37 far enough that it can be comfortably grasped with the user's hand.

For stationary operation, the sawing table 37 is first secured to a workbench. Next, the power fret saw 10 is inserted from above—with the front side oriented forward—into the recess 40 thereof, until the bearing face 18 of the lower housing 12 of the power fret saw 10 is aligned with the flat, level bearing face 137 of the sawing table 37. By subsequent displacement of the power fret saw 10 into the recess 40, the power fret saw 10 is clamped in bayonet-mountlike fashion relative to the sawing table 37, because the locking button 42 with its detent stop 43 locks in a recess 1210 of the base housing 12 and firmly restrains it—and thus the power fret saw 10—against unintended release from the sawing table 37.

The two guide springs 79 along the upper edge of the recess 40 have a wedgelike cross section. They are fastened three-dimensionally between the also wedgelike upper outer edge 68 of the base housing 12 and the wedgelike clamping clips 21, which extend in tapering fashion outward, on the outsides of the base housing 12. This three-dimensional clamping is horizontally improved by the provision that the outsides of the clamping clips 21 are braced in wedged fashion laterally against oblique faces of the ramps 73.

To release the power fret saw 10 from the sawing table 37, the locking button 42 must first be pressed downward relative to the surface 41, so that the detent stop 43 can emerge at the bottom from the recess 1210, thus undoing the locking. By ensuing horizontal displacement of the power tool from the recess 40, the power fret saw 10 can be removed upward from the sawing table 37, once the clamping clips 21 have reached the recesses 75 of the guide spring 69.

By the inclination of the handgrip 13 by approximately 20° relative to the housing 12, the machine rests securely in the hand of the user; the weight of the machine is absorbed by the back of the hand and by the forearm, and the freedom of motion of the power fret saw upon its rotation and pivoting is optimally controllable.

In handheld operation of the power fret saw 10 coupled to the sawing table 37, the bearing face 137 of the sawing table 37 can be pressed upward against the underside of the workpiece. Since the saw blade 33 saws downward upon traction, in the process the workpiece 19 is pulled against the bearing faces 18, 137 of the base housing 12 and of the sawing table 37, respectively. Vibration-free, quiet sawing is possible as a result.

The lugs 130 that laterally protrude past or frame the toggle switch 15 prevent unintended actuation of the power fret saw, for instance upon insertion of the power fret saw 10 into the sawing table 37.

The inside view shown in FIG. 16 of the right half-shell 1202 of the base housing 12 clearly shows the handgrip 13, the throat 14, one of the lugs 130, the mounting slot 35, the orifice 1211 for the lower arm 221 to pass through and be closely gripped annularly, and screw passage holes for firm coupling of the housing 12 to the bracket 22.

In a supplement to FIG. 16, FIG. 17 shows the left half-shell 1201 of the base housing 12 with the mounted motor 11 and gear 80; the motor housing 110, via rubber rings 112, forms elastic bearing points 111 so the motor 11 is held in a way that damps vibration. A motor shaft 1103 supports a fan 113 and axially adjacent it a pinion 114, which meshes with a counterpart pinion 115. The counterpart pinion 115 is seated in a manner fixed against relative rotation on a crankshaft 116, which on its free end has a crank peg 119 for driving the connecting rod 67.

What is claimed is:

1. A handheld power fret saw (10) having a power fret saw blade (33) and two arms, wherein said saw blade (33) is clamped releasably between the two arms (122, 222), wherein said two arms comprise a U-shaped bracket (22) comprising tubing, wherein an end of one of the arms (221, 222) has a handgrip (13), characterized in that:

the power fret saw (10) is releasably mountable to a sawing table (37), thereby forming a portable handheld power tool, and wherein said portable handheld power tool converts to a stationary tool when the sawing table (37) is secured to a workbench, wherein a base housing (12) adjoins the handgrip (13) and extends farther to the rear and acts as a forearm support, wherein the handgrip (13) extends under the sawing table in such a way that the handgrip can be grasped and guided freely with a hand of the user, so that the power fret saw (10) coupled to the sawing table (37) is used handily and conveniently together with the sawing table as a portable handheld power tool for selected purposes and the base housing (12) and the sawing table (37) have flat upper faces which are in alignment and on the same planar surface with each other.

2. A handheld power fret saw (10) having a power fret saw blade (33) and two arms, wherein said saw blade (33) is clamped releasably between the two arms (122, 222), wherein said two arms comprise a U-shaped bracket (22) comprising tubing, wherein an end of one of the arms (221, 222) has a handgrip (13), characterized in that:

the power fret saw (10) is releasably mountable to a sawing table (37), thereby forming a portable handheld power tool, and wherein said portable handheld power tool converts to a stationary tool when the sawing table (37) is secured to a workbench, wherein a lower one of said two arms (221) carries a base housing (12), from which the handgrip (13) emerges to form a curved angled throat (14), wherein in an operating position, said throat (14) conforms to a hand of a user and is clamped vertically thereto and horizontally therein, wherein said lower arm (221) emerges at the back from the base housing (12) and merges in curved fashion at a top and front with a second of the two arms (222), and the base housing (12) and the sawing table (37) have flat upper faces which are in alignment and on the same planar surface with each other.

3. A handheld power fret saw (10) having a power fret saw blade (33) and two arms, wherein said saw blade (33) is clamped releasably between the two arms (122, 222), wherein said two arms comprise a U-shaped bracket (22) comprising tubing, wherein an end of one of the arms (221, 222) has a handgrip (13), characterized in that:

the power fret saw (10) is releasably mountable to a sawing table (37), thereby forming a portable handheld power tool, and wherein said portable handheld power tool converts to a stationary tool when the sawing table (37) is secured to a workbench, wherein the sawing table (37) has a vacuum cleaning stub (38) for attaching a vacuum cleaning coupling to a vacuum cleaner that communicates with a vacuum cleaning opening (39) on bearing faces (18, 137) of a base housing (12).

4. A handheld power fret saw (10) having a power fret saw blade (33) and two arms, wherein said saw blade (33) is clamped releasably between the two arms (122, 222) wherein said two arms comprise a U-shaped bracket (22) comprising tubing, wherein an end of one of the arms (221, 222) has a handgrip (13), characterized in that:

the power fret saw (10) is releasably mountable to a sawing table (37), thereby forming a portable handheld power tool, and wherein said portable handheld power tool converts to a stationary tool when the sawing table (37) is secured to a workbench, wherein the sawing table (37) has a continuous recess (40) open at one side, wherein said continuous recess corresponds with a contour of a base housing (12) and into which the power fret saw (10) can be inserted.

5. The fret saw of claim 4, wherein the power fret saw (10) is insertable with the base housing (12) into the recess (40) such that an upper support face (137) of the sawing table (37) is flush with a bearing face (18) of the base housing (12), wherein said upper support face (137) includes grooves, and wherein said bearing face (18) of the base housing (12) is uniformly distributed on spacing and depth of the grooves (20).

6. The fret saw of claim 4, wherein the sawing table (37) and the based housing (12) are coupled without play via longitudinal guides (21, 68, 69, 70, 73), said guides disposed in said continuous recess (40).

7. The fret saw of claim 4, wherein the base housing (12) on opposite sides on its outside has guide grooves (70), which correspond with guide springs (69) in the continuous recess (40) of the sawing table (37).

8. A handheld power fret saw (10) having a power fret saw blade (33) and two arms, wherein said saw blade (33) is clamped releasably between the two arms (122, 222), wherein said two arms comprise a U-shaped bracket (22) comprising tubing, wherein an end of one of the arms (221, 222) has a handgrip (13), characterized in that:

the power fret saw (10) is releasably mountable to a sawing table (37), thereby forming a portable handheld power tool, and wherein said portable handheld power tool converts to a stationary tool when the sawing table (37) is secured to a workbench, wherein the power fret saw (10) has a bearing face (18) for supporting a workplace (19) on top of a base housing (12), wherein said base housing (12) carries the handgrip (13), wherein the base housing (12) and the sawing table (37) are movable relative to one another, and wherein upon coupling to the sawing table (37), a flat, upper bearing face (18) of said base housing (12) is oriented in alignment with a flat, upper support face (137) of the sawing table (37), wherein the support face includes grooves (20).

9. A handheld power fret saw (10) having a power fret saw blade (33) and two arms, wherein said saw blade (33) is clamped releasably between the two arms (122, 222), wherein said two arms comprise a U-shaped bracket (22) comprising tubing, wherein an end of one of the arms (221, 222) has a handgrip (13), characterized in that;

the power fret saw (10) is releasably mountable to a sawing table (37), thereby forming a portable handheld power tool, and wherein said portable handheld power tool converts to a stationary tool when the sawing table (37) is secured to a workbench, wherein said power fret saw has a bearing face (18) for supporting a workpiece (19) disposed on a base housing (12), wherein said bearing face (18) has a flat course above a lower one of said two arms (221), so that workpieces (19) machined between the arms (122, 222) are displaced on the bearing faces (18, 137) up to a stop at an arch of the bracket (22), without touching one of the arms (221, 222).

10. A handheld power fret saw (10) having a power fret saw blade (33) and two arms, wherein said saw blade (33) is clamped releasably between the two arms (122, 222), wherein said two arms comprise a U-shaped bracket (22) comprising tubing, wherein an end of one of the arms (221, 222) has a handgrip (13), characterized in that:

the power fret saw (10) has a base housing (12) and is releasably and rigidly mountable to a sawing table (37), thereby forming a portable handheld power tool, wherein said power fret saw (10), when rigidly coupled to the sawing table, is operatable with only a single hand of a user, and wherein said portable handheld power tool converts to a stationary tool when the sawing table (37) is secured to a workbench and the base housing (12) and the sawing table (37) have flat upper faces which are in alignment and on the same planar surface with each other.

11. The fret saw of claim 1, wherein the sawing table (37) has access openings for clamping means for fixing the sawing table (37) to a workbench.

12. The fret saw of claim 10, wherein the sawing table (37) has through holes (44) for screws for fixing the sawing table (37) to a workbench.

* * * * *